(12) United States Patent
Liu et al.

(10) Patent No.: US 8,625,541 B2
(45) Date of Patent: Jan. 7, 2014

(54) SEAMLESS SESSION SWITCHING METHOD AND MOBILE TERMINAL

(75) Inventors: Haijun Liu, Shenzhen (CN); Ling Hong, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 311 days.

(21) Appl. No.: 13/057,718

(22) PCT Filed: Aug. 7, 2009

(86) PCT No.: PCT/CN2009/073141
§ 371 (c)(1),
(2), (4) Date: Feb. 4, 2011

(87) PCT Pub. No.: WO2010/017752
PCT Pub. Date: Feb. 18, 2010

(65) Prior Publication Data
US 2011/0149871 A1    Jun. 23, 2011

(30) Foreign Application Priority Data

Aug. 12, 2008   (CN) .......................... 2008 1 0118275

(51) Int. Cl.
*H04W 4/00* (2009.01)
(52) U.S. Cl.
USPC .......................................... 370/332; 370/436
(58) Field of Classification Search
None
See application file for complete search history.

(56) References Cited

U.S. PATENT DOCUMENTS

| 2007/0178932 | A1* | 8/2007 | Miklos et al. ................. | 455/525 |
| 2009/0022103 | A1* | 1/2009 | Shatsky ....................... | 370/331 |
| 2012/0327899 | A1* | 12/2012 | Kalbag et al. ................ | 370/331 |

FOREIGN PATENT DOCUMENTS

| CN | 1784864 A | 6/2006 |
| CN | 1817007 A | 8/2006 |
| CN | 101340722 A | 1/2009 |
| WO | 2006076694 A2 | 7/2006 |

* cited by examiner

*Primary Examiner* — Chi Pham
*Assistant Examiner* — Mohammad Adhami
(74) *Attorney, Agent, or Firm* — McGarry Bair PC (57) ABSTRACT

A seamless session switching method and a mobile terminal are provided in the present invention. The method includes: a first mobile terminal establishing a first VOIP session with a second terminal via an initial wireless network; the first mobile terminal acquiring a target wireless network when the first mobile terminal detects that a switching event occurs; the first terminal transmitting a second session request to the second terminal via the target wireless network, and keeping the first VOIP session continued; and the first mobile terminal establishing a second VOIP session with the second terminal via the target wireless network after receiving an acknowledge message for the second session request from the second terminal, and terminating the first VOIP session after the second VOIP session is established. The present invention can realize the seamless free switching, and use a better wireless network for the session, so as to increase the session quality of the user.

12 Claims, 5 Drawing Sheets

SEAMLESS SESSION SWITCHING METHOD AND MOBILE TERMINAL

CROSS-REFERENCE TO RELATED APPLICATIONS

This application is a National Phase application of International Application No. PCT/CN2009/073141, filed Aug. 7, 2009, which claims the benefit of Chinese Patent Application No. 200810118275.X, filed Aug. 12, 2008, both of which are incorporated herein by reference in their entirety.

FIELD OF THE INVENTION

The present invention generally relates to communication field, in particular to a seamless switching method in a VOIP session and a mobile terminal.

BACKGROUND OF THE INVENTION

Voice Over Internet Protocol (VOIP) is a packetized and digitized transmission technology based on the Internet protocol (IP) technology. The basic principle of VOIP is as follows: compressing and encoding the voice by voice compression algorithm, then packaging the compressed voice data according to relevant protocol(s) (e.g., IP protocol), then transmitting the packages to a destination via the IP network, then connecting these voice data packets in series, and restoring these voice data packets to the original voice signal after decoding and decompressing process, so as to achieve the purpose of transmitting voice over IP network.

An IP Phone System transforms analog signals of an ordinary phone into IP packets which can be transmitted by a computer through accessing the Internet; meanwhile, it also transforms the received IP packets into analog electronic signals of the voice. The application of voice communication between a computer network and the fixed network by using VOIP software in a personal computer (PC) has been well developed.

With the rapid development of mobile communications, due to the increase of equipment capacity and the network bandwidth of a mobile terminal, it is possible to realize a real-time voice data intercommunication between a computer network terminal and a mobile communication network terminal and between mobile communication network terminals. By using VOIP technology, IP phone applications can be carried out on an IP-based data communication network, such as the enterprise Local Area Network (LAN), Wide Area Network (WAN), Worldwide Internet and so on. Making the international and domestic long-distance call by IP phone has low cost, which reduces communication costs, and ensures a good voice quality at the same time. With the development of the network communication and wireless technology, a mobile phone can simultaneously support multiple wireless technologies for accessing a telephone service network. With the support of the multiple wireless technologies, a mobile phone can support VOIP session function, for example, a mobile phone supports General Packet Radio Service (GPRS), Enhanced Data Charge for GSM Evolution (EDGE), Wireless LAN based on the IEEE 802.11b standard (Wireless Fidelity, abbreviated as WIFI), Worldwide Interoperability Network for Microwave Access (WIMAX), and it accesses an IP link of the core network via these networks, so as to provide VOIP services. As the coverage construction, charges and quality of service (QOS) differ in different wireless networks, during communicating via a wireless network, if a user departs from the current wireless network coverage, or wants to switch to another wireless network, it leads to a session interruption. Therefore, there is a need for a seamless switching method which can ensure that the originally initiated session will not be interrupted when the user switches among different wireless networks, and that the switch can be freely realized.

SUMMARY OF THE INVENTION

In view of the above, the object of the embodiments of the present invention is to provide a seamless switching method that a mobile terminal which supports multiple wireless networks realizes un-interrupted VOIP session.

To achieve the above-mentioned purpose, in accordance with one aspect of the invention, a seamless session switching method is provided.

The seamless session switching method in accordance with the present invention, which is used in a VOIP session, comprises:

a first mobile terminal establishing a first VOIP session with a second terminal via an initial wireless network;

the first mobile terminal acquiring a target wireless network when the first mobile terminal detects that a switching event occurs;

the first terminal transmitting a second session request to the second terminal via the target wireless network, and keeping the first VOIP session continued; and the first mobile terminal establishing a second VOIP session with the second terminal via the target wireless network after receiving an acknowledge message for the second session request from the second terminal, and terminating the first VOIP session after the second VOIP session is established.

Preferably, the above-mentioned method further comprises:

the first mobile terminal transmitting test information to wireless networks, determining and recording status information of the wireless networks supported by the first mobile terminal according to feedback information, and updating a network list; and the first mobile terminal acquiring the target wireless network according to the status information of the wireless networks in the network list.

Preferably, the wireless networks establish priority levels according to preset parameters, and the target wireless network acquired by the first mobile terminal is the wireless network with the highest priority level in the network list.

Preferably, the preset parameters comprise network quality of the wireless networks, charge of the wireless networks, quality of service (QOS) of the wireless networks, session requirements of a user.

Preferably, the above-mentioned method comprises: presetting a time threshold, every other time threshold the first mobile terminal transmitting the test information to the wireless networks to acquire the feedback information of each of the wireless networks, and updating the network list of the first mobile terminal according to the feedback information.

Preferably, the switching event comprises: current wireless network quality being lower than a preset threshold, a switching request of a user, and departure from the coverage of the wireless network.

Preferably, the wireless network comprises:

WIFI network, WIMAX network, LTE network, and EDGE network.

To achieve the above-mentioned purposes, in accordance with another aspect of the invention, a mobile terminal is provided.

In accordance with the present invention, the mobile terminal comprises:

a detection unit, configured to detect whether a switching event occurs;

a selection unit, configured to select a target wireless network;

a VOIP session unit, configured to transmit/receive a VOIP session request, to establish a first VIOP session with a second terminal via an initial wireless network and an IP core network, and establish a second VOIP session with the second terminal via the target wireless network selected by the selection unit and the IP core network, after the detection unit detects that a switching event occurs; and a switching unit, configured to terminate the first VOIP session after the second VOIP session is established, and perform a switching from the initial wireless network to the target wireless network.

Preferably, the above-mentioned mobile terminal further comprises:

a management unit, configured to transmit test information to wireless networks, and determine and record status information of the wireless networks supported by the first mobile terminal according to feedback information, and update a network list; and a storage unit, configured to store the network list which comprises wireless networks supported by the mobile terminal and the status information thereof, wherein the selection unit selects the target wireless network from the network list of the storage unit.

Preferably, the wireless networks in the network list establish priority levels according to preset parameters; and the target wireless network is the wireless network with the highest priority level in the network list.

Preferably, the switching event comprises: current wireless network quality being lower than a preset parameter, a switching request of a user, departure from the coverage of the wireless network.

Preferably, the wireless network comprises: WIFI network, WIMAX network, LTE network, and EDGE network.

According to the technical solution provided by the present invention, when the current wireless network quality is declined which leads to the decline of session quality of the user, or when departing from the current wireless network, or when other switching event occurs, the session of the user will not be interrupted, seamless free switching can be realized, and a better wireless network can be used for the session, so as to increase the session quality of the user, through selecting a wireless network with better quality as a target wireless network, transmitting a second session request on the target wireless network to establish a second VOIP session, and switching from the initial wireless network to the target wireless network after the second VOIP session is established.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

Functionality Overview

In the technical solution provided in accordance with the embodiments of the present invention, when a mobile terminal detects a switching event, the mobile terminal obtains a target wireless network through which a second session request is initiated, and establishes a second VOIP session and afterwards switches from the initial wireless network to the target wireless network, so that the session of the user is not interrupted and seamless free switching can be realized.

A detailed description will be given in connection with drawings and embodiments. It is to be noted that, the embodiments of the application and the features in the embodiments can be combined with each other if there is no conflicts.

Method Embodiments

Figure 1:
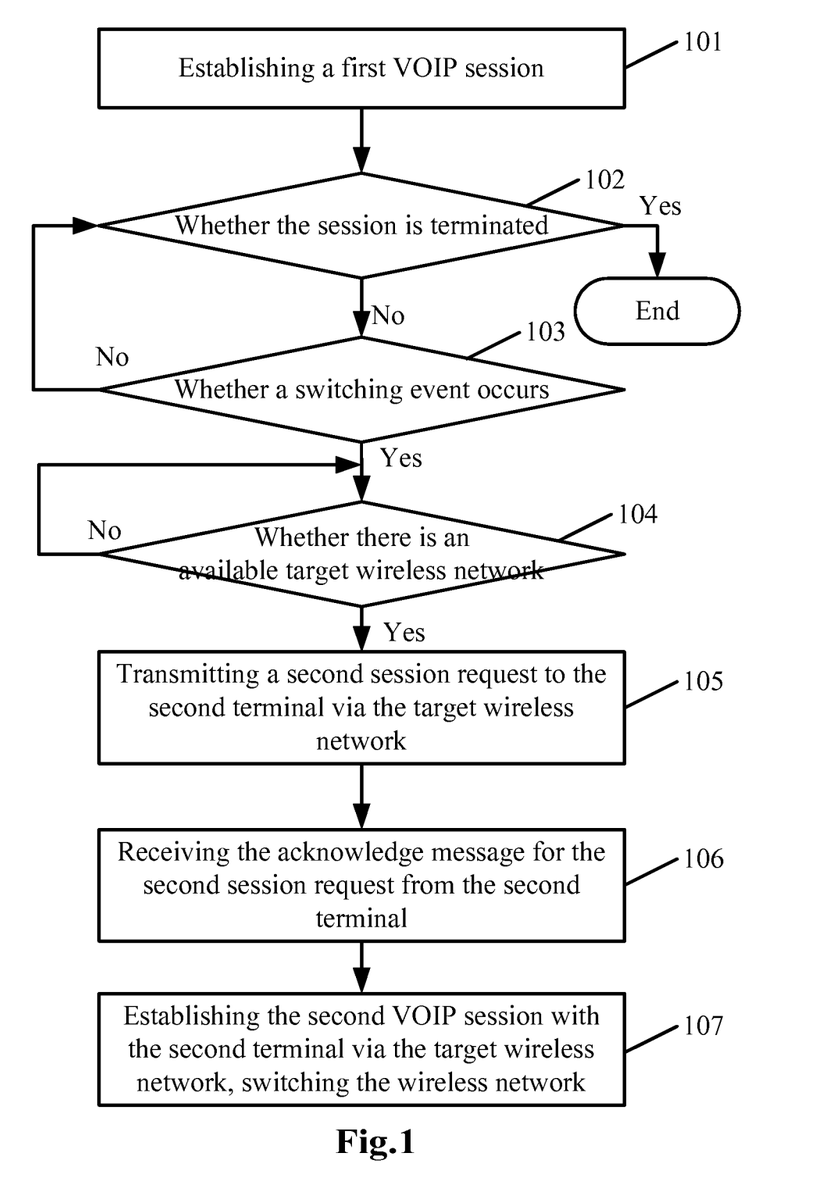
FIG. 1 is a flowchart of the seamless session switching method according to Embodiment 1 of the present invention.

FIG. 1 is a flowchart of the a seamless session switching method according to preferable Embodiment 1 of the present invention, and as shown in FIG. 1, the above-mentioned method comprises Step 101 to Step 107:

Step 101, establishing, by a first mobile terminal, a first VOIP session with a second terminal via an initial wireless network, and then entering Step 102.

The seamless session switching method described in the embodiments of the present invention is implemented in a mobile terminal, which can be a mobile phone. In prior art, a VOIP session can be established between mobile phones, between a mobile phone and a fixed phone, and between a mobile phone and a computer via a wireless network and an IP core network. For the purpose of conciseness, the principle of a VOIP session establishment process is not described in detail herein. From the above description, it can be known that the second terminal may be a fixed phone, a mobile phone, or a computer. In the embodiment of the present invention, the second terminal is preferably a mobile phone which supports the VOIP session.

Step 102, determining whether the session is terminated, wherein if yes, the flow is ended, and otherwise, it enters Step 103.

Step 103, determining whether a switching event occurs, wherein if yes, it enters Step 104, and otherwise, it goes back to Step 102.

Those skilled in the art can understand that the switching event described in the embodiment of the present invention comprises, but is not limited to, the current wireless network quality being lower than a preset threshold, the switching request of the user, departure from the coverage of the wireless network, in which the preset threshold can be configured according to practical requirement; such as the user can not make a phone call, the quality of the session has a substantial decline or the like.

Step 104, determining whether there is an available target wireless network, wherein if yes, it enters Step 105, and otherwise, the present step is repeated.

It can be easily understood that the network quality or other parameters of the target wireless network are better than those of the current wireless network, and better session quality can be achieved.

Step 105, transmitting a second session request to the second terminal via the target wireless network.

The first mobile terminal (i.e., the mobile phone) transmits to the second terminal the second session request via the target wireless network and IP core network, to request for establishing a second VOIP session, and then waits for the feedback of the second terminal, wherein the second session request carries the information used in a switching, such as an IP address or the like.

Step 106, entering Step 107 after receiving an acknowledge message for the second session request from the second terminal.

The mobile terminal transmits a session request to the second terminal. Before receiving the acknowledge message from the second terminal and establishing a second VOIP session, the first VOIP session is kept uninterrupted, and the first mobile terminal continues the session with the second terminal via the first VOIP session.

Step 107, establishing a second VOIP session with the second terminal via the target wireless network, and switching from the initial wireless network to the target wireless network.

After the first mobile terminal receives the acknowledge message from the second terminal, it represents that the VOIP session can be established. The first mobile terminal establishes the second VOIP session with the second terminal via the target wireless network and the IP core network, and after the second VOIP session is established, the first mobile terminal terminates the first VOIP session and switches from the initial wireless network to the target wireless network.

Those skilled in the art can understand that the wireless network described in the embodiments of the present invention comprises, but is not limited to, WIFI network, WIMAX network, LTE network, and EDGE network.

In the technical solution provided by the embodiments of the present invention, when the current wireless network quality is declined which leads to the decline of session quality of the user, or when departing from the current wireless network, or when other switching event occurs, the session of the user will not be interrupted, seamless free switching can be realized, and a better wireless network can be used for the session, so as to increase the session quality of the user, through selecting a wireless network with better quality as a target wireless network, transmitting a second session request on the target wireless network, establishing a second VOIP session, and switching from the initial wireless network to the target wireless network after the second VOIP session is established.

Figure 2:
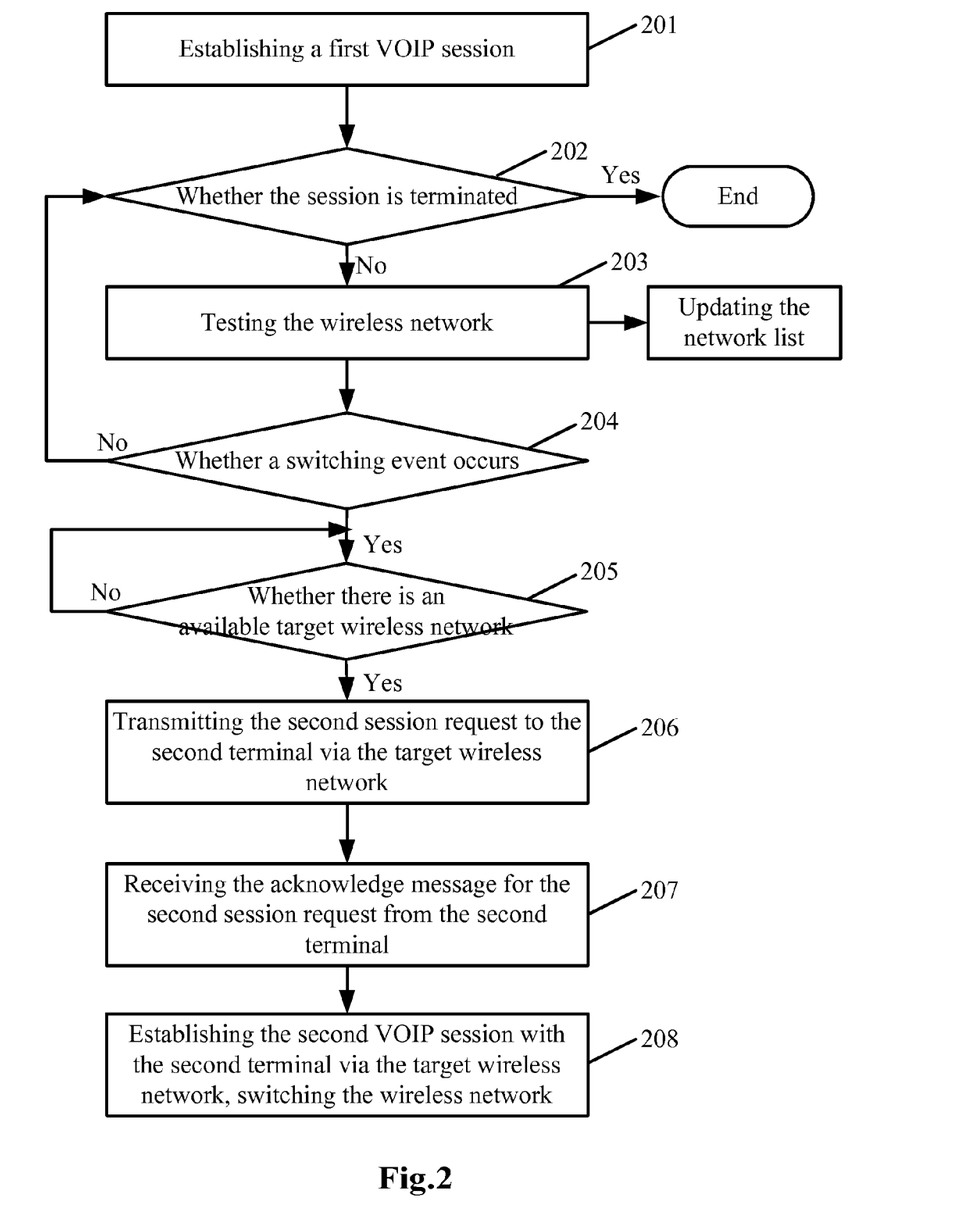
FIG. 2 is a flowchart of the seamless session switching method according to Embodiment 2 of the present invention.

FIG. 2 is a flowchart of a seamless session switching method according to Embodiment 2 of the present invention, and the above method comprises Step 201 to Step 208:

Step 201, establishing, by a first mobile terminal, a first VOIP session with a second terminal via an initial wireless network, and entering Step 202.

The seamless session switching method described in the embodiments of the present invention is implemented in a mobile terminal, which may be a mobile phone. In prior art, a VOIP session can be established between mobile phones, between a mobile phone and a fixed phone, and between a mobile phone and a computer via a wireless network and an IP core network. For the purpose of conciseness, the principle of a VOIP session establishment process is not described in detail herein. From the above description, it can be known that the second terminal may be a fixed phone, a mobile phone, or a computer, and the second terminal is preferably a mobile phone which supports the VOIP session in the embodiments of the present invention.

Step 202, determining whether the session is ended, wherein if yes, the flow is ended, and otherwise, it enters Step 203.

Step 203, testing the wireless network.

The first mobile terminal transmits test information to each wireless network, and determines the wireless networks supported by the first mobile terminal and the status information of these wireless networks according to feedback information from each wireless network. When discovering a new available wireless network, the first mobile terminal registers to the core network via the new wireless network, establishes a network list on the first mobile terminal and obtains a target wireless network from the network list.

Those skilled in the art can understand that, it is not necessary to limit Step 203 to be performed after Step 202 and before Step 204. Step 203 can be carried out at any time, and it will not affect the realization of the technical solution of the embodiments of the present invention, if Step 203 is carried out when there is not any session made on the mobile phone. There should not be any limitations imposed to the sequence of the steps according its serial number.

Each of the wireless networks in the network list establishes priority level according to preset parameters. The target wireless network acquired by the first mobile terminal is the wireless network which has the highest priority level in the network list.

The preset parameters comprise, but are not limited to: the network quality of the wireless network, the charge of the wireless network, the quality of service of the wireless network, and the session requirement of the user.

A mobile phone tests each of the wireless networks, and preferably presets a time threshold. The first mobile terminal transmits test information to the wireless network every other time threshold, obtains the feedback information from each of the wireless networks, and updates the network list of the first mobile terminal according to the above feedback information. The practical network condition and the requirement of the user can be used for setting the time threshold which can be 1s, 10s, 100s, . . . (which is not limited in the embodiments of the present invention), so that the network list of the mobile terminal can be updated according to the practical condition.

In the present step, when the mobile terminal discovers a new available wireless network, it registers to the core network through the newly discovered wireless network, and maintains the network list on the mobile terminal, i.e., records the newly discovered wireless network parameter in the network list.

Step 204, determining whether a switching event occurs, wherein if yes, it enters Step 205, and otherwise, it goes back to Step 202.

Those skilled in the art can understand that the switching event described in the embodiment of the present invention comprises, but is not limited to, the current wireless network quality being lower than a preset threshold, the switching request of the user, and departure from the coverage of the wireless network, in which the preset threshold can be configured according to practical requirement; such as the user can not make a phone call, the quality of the session has a substantial decline or the like.

Step 205, determining whether there is an available target wireless network in the network list, wherein if yes, it enters Step 206, and otherwise, the current step is repeated.

It is easy to understand that when there is a plurality of available target wireless networks in the network list, the first mobile terminal selects the wireless network with the highest priority level as the target wireless network; wherein the priority level can be arranged according to different parameters set by different requirements. For example, it may be arranged according to the charges of the wireless networks, the current network quality, the network coverage, and be arranged comprehensively according to all these parameters.

Step 206, transmitting a second session request to the second terminal via the target wireless network.

The first mobile terminal (i.e., the mobile phone) transmits to the second terminal the second session request via the target wireless network and IP core network, to request for establishing a second VOIP session, and then waits for the feedback of the second terminal, wherein the second session request carries the information used in a switching, such as an IP address or the like.

Step 207, entering Step 208, after receiving an acknowledge message for the second session request from the second terminal,.

The mobile terminal transmits a session request to the second terminal. Before receiving the acknowledge message from the second terminal and establishing a second VOIP session, the first VOIP session is kept uninterrupted, and the first mobile terminal continues the session with the second terminal via the first VOIP session.

Step 208, establishing a second VOIP session with the second terminal via the target wireless network, and switching from the initial wireless network to the target wireless network.

After the first mobile terminal receives the acknowledge message from the second terminal, it represents that the VOIP session can be established. The first mobile terminal establishes the second VOIP session with the second terminal via the target wireless network and the IP core network. After the second VOIP session is established, the first mobile terminal terminates the first VOIP session and switches from the initial wireless network to the target wireless network, and the session between users can be continued in the new network.

Those skilled in the art can understand that the wireless network described in the embodiments of the present invention comprises, but is not limited to, WIFI network, WIMAX network, LTE network, and EDGE network.

In the technical solution provided by the embodiment of the present invention, when the current wireless network quality is declined which leads to the decline of session quality of the user, or when departing from the current wireless network, or when other switching event occurs, the session of the user will not be interrupted, and seamless free switching can be realized, through selecting the wireless network with highest priority level as the target wireless network, and initiating a second session request in the target wireless network to establish a second VOIP session, and switching from the initial wireless network to the target wireless network after the second VOIP session is established. Besides, the mobile terminal can updates the network list in time via testing each of the wireless networks continuously, so as to find a currently optimal wireless network, and switch to the wireless network with a higher priority in time.

Figure 3:
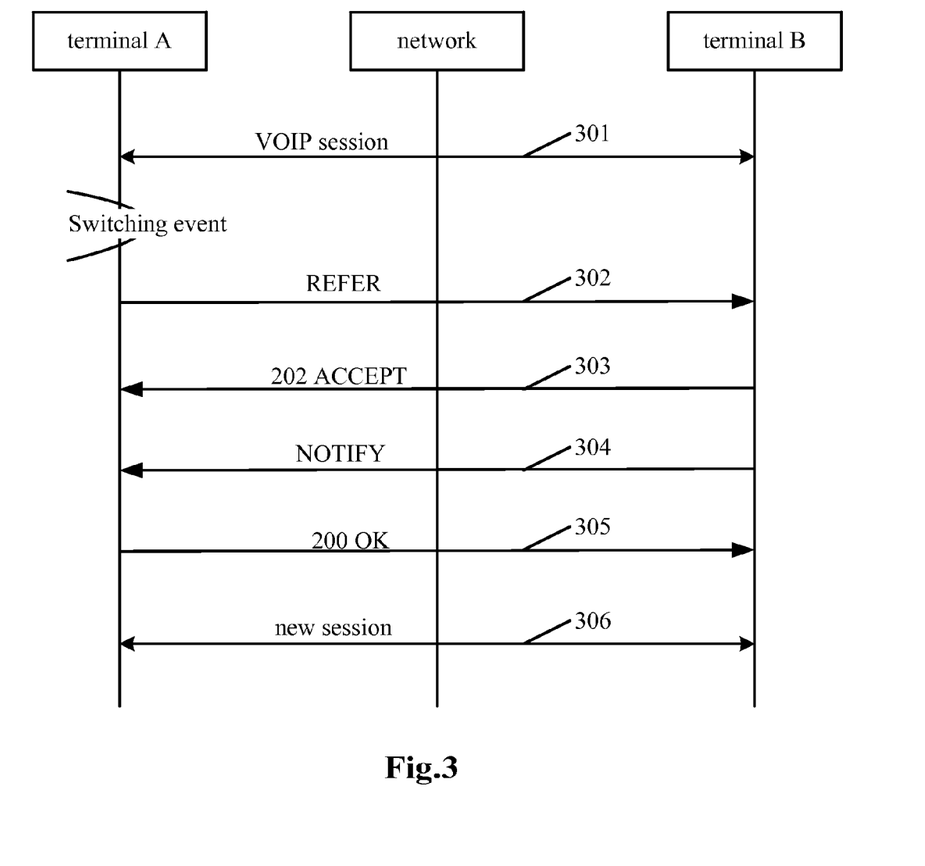
FIG. 3 is a schematic diagram of the SIP signaling flow according to an embodiment of the present invention.

FIG. 3 is a flowchart of the SIP signaling flow according to the embodiment of the present invention. As shown in FIG. 3, it comprises the following Step 301 to Step 306:

Step 301, terminal A and terminal B establish a VOIP session by the SIP signaling, and after the session is established successfully, media messages are transmitted for communication.

Step 302, when an event of requiring switching occurs to terminal A, such as, the current network signal is weakened and/or the signal of another wireless network is better, terminal A transmits an SIP REFER message which carries the information used in switching, such as an IP address or the like.

Step 303, terminal B replies an SIP 202 message to accept the request.

Step 304, the terminal B transmits an SIP NOTIFY message to the terminal B.

Step 305, the terminal A replies an SIP 200 OK message to the terminal B.

Step 306, the two parties then establish a new session, and after the establishment is successful, the original session is terminated, media messages are transmitted in the new session, and the two parties keep on the communication.

The technical solution described in the embodiments of the present invention is applicable to 3GPP IMS domain, and 3GPP2 MMD domain.

From the above description, it can be seen that the seamless session switching method provided in the embodiments of the present invention can realize the seamless free switching, and use a better wireless network for communication, so as to increase the session quality of user.

According to the embodiments of the present invention, a kind of computer readable medium is provided for storing computer executable instructions. When the instructions are executed by a computer or a processor, the computer or processor can execute each of the steps as shown in FIG. 1, FIG. 2, and FIG. 3, and preferably, it can execute one or more of the above-mentioned embodiments.

Device Embodiments

Figure 4:
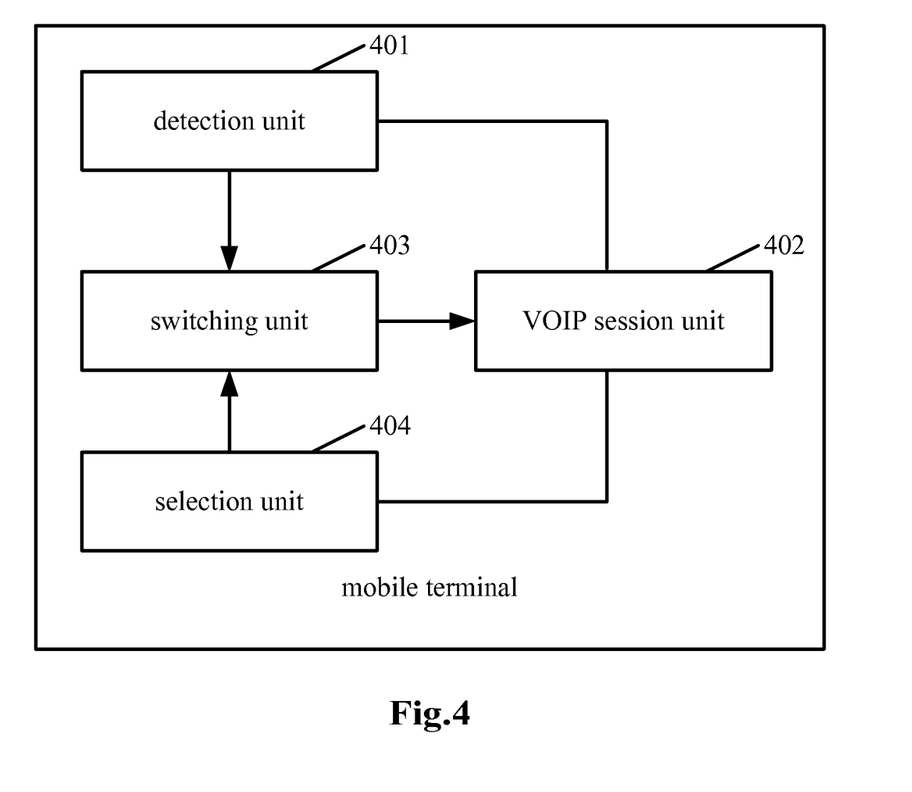
FIG. 4 is a schematic diagram of the composite structure of a mobile terminal according to Embodiment 3 of the present invention.

FIG. 4 is a schematic diagram of the composite structure of a mobile terminal according to preferable Embodiment 3 of the present invention, and as shown in FIG. 4, the mobile terminal comprises:

a detection unit 401, configured to detect whether a switching event occurs;

a VOIP session unit 402, configured to transmit/receive a VOIP session request, to establish a first VIOP session with a second terminal via an initial wireless network and an IP core network, and establish a second VOIP session with the second terminal via the target wireless network and the IP core network after the detection unit detects that a switching event occurs;

a switching unit 403, configured to terminate the first VOIP session after the second VOIP session is established, and perform a switching from the initial wireless network to the target wireless network; and a selection unit 404, configured to select the target wireless network.

Those skilled in the art can easily understand that, the mobile terminal described in the embodiments of the present invention further comprises universal units in a mobile terminal, such as a central processing unit, a display unit, an antenna unit, a button unit, and so on. For the purpose of conciseness, the detailed description of the universal composition of the mobile terminal and the work principle and the work process of each part is omitted herein.

The work process and work principle of the above-mentioned mobile terminal will be detailed hereinafter.

The mobile terminal first transmits a session request to the second terminal via the VOIP session unit. The first VOIP session is established after the acknowledgement of the second terminal. During the communication between the first mobile terminal and the second terminal, the detection unit of the mobile terminal detects whether a switching event occurs. If a switching event occurs, the selection unit selects one target wireless network, and transmits a second session request to the second terminal via the target wireless network, to request for establishing a second VOIP session. After receiving the acknowledge message from the second terminal, the mobile terminal establishes a second VOIP session with the second terminal. After the second VOIP session is established, the switching unit performs the switching from the initial wireless network to the target wireless network. The session between the users continues in the new network, so as to realize the seamless switching of the VOIP session.

Those skilled in the art can understand that the switching event described in the embodiment of the present invention comprises, but is not limited to, the current wireless network quality being lower than a preset threshold, the switching request of the user, and departure from the coverage of the wireless network, in which the preset threshold can be configured according to practical requirement; such as the user can not make a phone call, the quality of the session has a substantial decline or the like.

The above-mentioned wireless network comprises, but is not limited to, WIFI network, WIMAX network, LTE network, and EDGE network.

In the technical solution provided by the embodiments of the present invention, when the current wireless network quality is declined which leads to the decline of session quality of the user, or when departing from the current wireless network, or when other switching event occurs, the session of the user will not be interrupted, seamless free switching can be realized, and a better wireless network can be used for the session, so as to increase the session quality of the user, through selecting a wireless network with better quality as a target wireless network, transmitting a second session request on the target wireless network, establishing a second VOIP session, and switching from the initial wireless network to the target wireless network after the second VOIP session is established.

Figure 5:
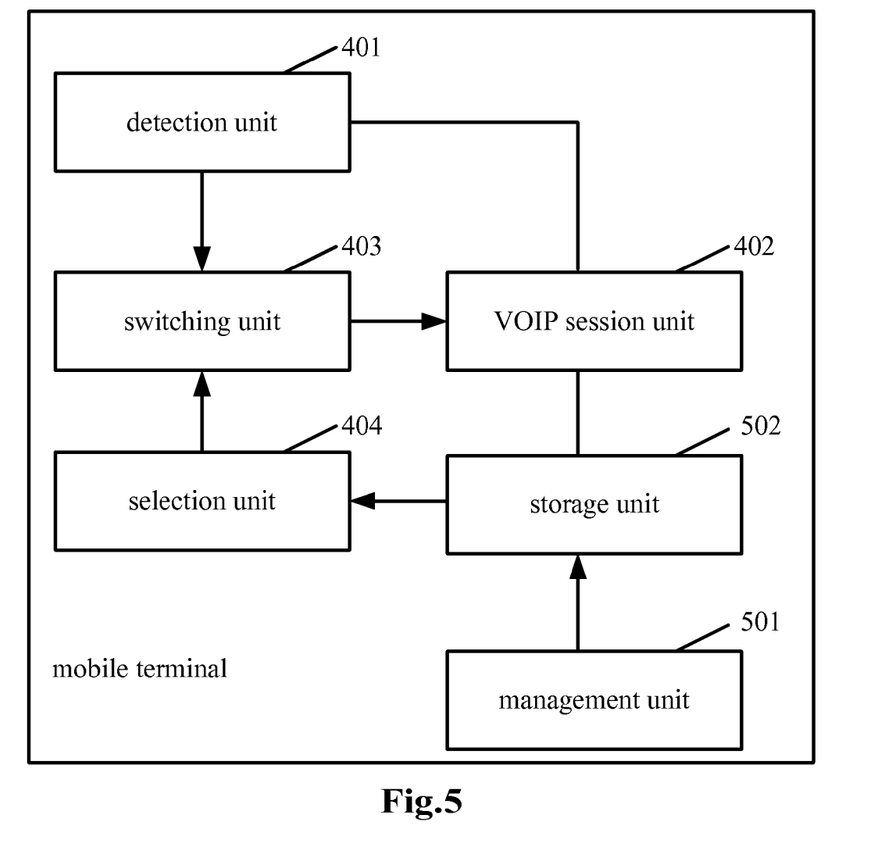
FIG. 5 is a schematic diagram of the composite structure of a mobile terminal according to Embodiment 4 of the present invention.

FIG. 5 is a schematic diagram of the composite structure of a mobile terminal according to preferable Embodiment 4 of the present invention, and as shown in FIG. 5, the mobile terminal comprises:

a detection unit 401, configured to detect whether a switching event occurs;

a VOIP session unit 402, configured to transmit/receive a VOIP session request, to establish a first VIOP session with a second terminal via an initial wireless network and an IP core network, and establish a second VOIP session with the second terminal via the target wireless network and the IP core network after the detection unit detects that a switching event occurs;

a switching unit 403, configured to terminate the first VOIP session after the second VOIP session is established, and perform a switching from the initial wireless network to the target wireless network;

a selection unit 404, configured to select a target wireless network from a network list;

a management unit 501, configured to transmit test information to wireless networks, and determine the wireless networks supported by the mobile terminal and the status information of each of the wireless networks according to feedback information, wherein when discovering a new available wireless network, it registers to the core network via the new wireless network;

a storage unit 502, configured to store the network list, wherein the above-mentioned network list comprises the wireless networks supported by the mobile terminal and the status information of each wireless network.

The above-mentioned selection unit selects the target wireless network from the network list of the storage unit.

Those skilled in the art can easily understand that, the mobile terminal described in the embodiments of the present invention further comprises universal units in a mobile terminal, such as a central processing unit, a display unit, an antenna unit, a button unit, and so on. For the purpose of conciseness, the detailed description of the universal composition of the mobile terminal and the work principle and the work process of each part is omitted herein.

The differences between the technical solution of the present embodiment and the technical solution of the preferable Embodiment 3 lies in that: the mobile terminal transmits test information to the wireless network via the management unit, and determines the wireless networks supported by the mobile terminal and the status information of each of wireless networks according to the feedback information. When discovering a new available wireless network, it registers to the core network via the new wireless network. In addition, the mobile terminal stores the network list in the storage unit with the network list comprising the wireless networks supported by the mobile terminal and the status information of each of the wireless networks. Such that the wireless networks supported by the mobile terminal and the status information of each of wireless networks can be updated in real time, and a better target wireless network can be provided for the switching of the mobile terminal.

Each of the wireless networks in the above-mentioned network list establishes the priority level according to the preset parameter. The target wireless network obtained by the first mobile terminal is the wireless network with the highest priority level in the network list.

The above preset parameters comprise, but are not limited to: the network quality of the wireless network, the charge of the wireless network, the quality of service of the wireless network, and the session requirement of user.

A mobile phone tests each of the wireless networks, and preferably presets a time threshold. The first mobile terminal transmits test information to the wireless network every other time threshold, obtains the feedback information from each of the wireless networks, and updates the network list of the first mobile terminal according to the above feedback information. The practical network condition and the requirement of the user can be used for setting the time threshold which can be 1s, 10s, 100s, . . . , and is not limited in the embodiments of the present invention, so that the network list of the mobile terminal can be updated according to the practical condition.

It is easy to understand that when there is a plurality of available target wireless networks in the network list, the first mobile terminal selects the wireless network with the highest priority level as the target wireless network, and the priority level can be arranged according to different parameters set by different requirements. For example, it may be arranged according to the charges of the wireless networks, the current network quality, the network coverage, and be arranged comprehensively according to all these parameters.

Those skilled in the art can understand that the switching event described in the embodiment of the present invention comprises, but is not limited to, the current wireless network quality being lower than a preset threshold, the switching request of the user, and departure from the coverage of the wireless network, in which the above preset threshold can be configured according to practical requirement; such as the user can not make a phone call, the quality of the session has a substantial decline or the like.

The above-mentioned wireless network comprises, but is not limited to, WIFI network, WIMAX network, LTE network, and EDGE network.

In the technical solution provided by the embodiment of the present invention, when the current wireless network quality is declined which leads to the decline of session quality of the user, or when departing from the current wireless network, or when other switching event occurs, the session of the user will not be interrupted, seamless free switching can be realized, through selecting the wireless network with highest priority level as the target wireless network, and transmitting a second session request in the target wireless network to establish a second VOIP session, and switching from the initial wireless network to the target wireless network after the second VOIP session is established. Besides, the mobile terminal can updates the network list in time by testing each of the wireless networks continuously, so as to find a currently optimal wireless network, and switch to the wireless network with a higher priority in time.

The technical solution described in the embodiments of the present invention is applicable to 3GPP IMS domain, and 3GPP2 MMD domain.

In addition, the system architecture and the current processing flow are not modified during the realization of the present invention, thus it is easy to be realized, and convenient to be popularized in the technical field, therefore the present invention has a strong industrial applicability.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A seamless session switching method used in a VOIP session, comprising:
    a first mobile terminal establishing a first VOIP session with a second terminal via an initial wireless network;
    the first mobile terminal acquiring a target wireless network when the first mobile terminal detects that a switching event occurs;
    the first terminal transmitting a second session request to the second terminal via the target wireless network, and keeping the first VOIP session continued;
    the first mobile terminal establishing a second VOIP session with the second terminal via the target wireless network after receiving an acknowledge message for the second session request from the second terminal, and terminating the first VOIP session after the second VOIP session is established;
    the first mobile terminal transmitting test information to wireless networks, determining and recording status information of the wireless networks supported by the first mobile terminal according to feedback information, and updating a network list; and
    the first mobile terminal acquiring the target wireless network according to the status information of the wireless networks in the network list;
    wherein the wireless networks establish priority levels according to preset parameters, and the target wireless network acquired by the first mobile terminal is the wireless network with the highest priority level in the network list.

2. The method according to claim 1, wherein the preset parameters comprise at least one of:
    network quality of the wireless networks, charge of the wireless networks, quality of service (QOS) of the wireless networks, and session requirements of a user.

3. The method according to claim 1, further comprising:
    presetting a time threshold, every other time threshold the first mobile terminal transmitting the test information to the wireless networks to acquire the feedback information of each of the wireless networks, and updating the network list of the first mobile terminal according to the feedback information.

4. The method according to claim 1, wherein the switching event comprises:
    current wireless network quality being lower than a preset threshold, a switching request of a user, or departure from the coverage of the initial wireless network.

5. The method according to claim 1, wherein the initial and the target wireless networks comprise:
    WIFI network, WIMAX network, LTE network, or EDGE network.

6. A mobile terminal, comprising:
    a detection unit, configured to detect whether a switching event occurs;
    a selection unit, configured to select a target wireless network;
    a VOIP session unit, configured to transmit/receive a VOIP session request, to establish a first VIOP session with a second terminal via an initial wireless network and an IP core network, and establish a second VOIP session with the second terminal via the target wireless network selected by the selection unit and the IP core network, after the detection unit detects that a switching event occurs;
    a switching unit, configured to terminate the first VOIP session after the second VOIP session is established, and perform a switching from the initial wireless network to the target wireless network;
    a management unit, configured to transmit test information to wireless networks, and determine and record status information of the wireless networks supported by the first mobile terminal according to feedback information, and update a network list; and
    a storage unit, configured to store the network list which comprises wireless networks supported by the mobile terminal and the status information thereof, wherein the selection unit selects the target wireless network from the network list of the storage unit;
    wherein the wireless networks in the network list establish priority levels according to preset parameters; and the target wireless network is the wireless network with the highest priority level in the network list.

7. The mobile terminal according to claim 6, wherein the switching event comprises:

current wireless network quality being lower than a preset parameter, a switching request of a user, or departure from the coverage of the initial wireless network.

8. The method according to claim 6, wherein the initial and the target wireless networks comprise:
   WIFI network, WIMAX network, LTE network, or EDGE network.

9. The method according to claim 2, wherein the initial and the target wireless networks comprise:
   WIFI network, WIMAX network, LTE network, or EDGE network.

10. The method according to claim 3, wherein the initial and the target wireless networks comprise:
    WIFI network, WIMAX network, LTE network, or EDGE network.

11. The method according to claim 4, wherein the initial and the target wireless networks comprise:
    WIFI network, WIMAX network, LTE network, or EDGE network.

12. The method according to claim 7, wherein the initial and the target wireless networks comprise:
    WIFI network, WIMAX network, LTE network, or EDGE network.

* * * * *